US012041656B2

(12) United States Patent
Zhang et al.

(10) Patent No.: US 12,041,656 B2
(45) Date of Patent: Jul. 16, 2024

(54) CHANNEL OCCUPANCY TIME (COT) SHARING PROPAGATION

(71) Applicant: QUALCOMM Incorporated, San Diego, CA (US)

(72) Inventors: Xiaoxia Zhang, San Diego, CA (US); Shuanshuan Wu, San Diego, CA (US); Jing Sun, San Diego, CA (US); Arthur Gubeskys, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/368,560

(22) Filed: Jul. 6, 2021

(65) Prior Publication Data

US 2022/0039161 A1 Feb. 3, 2022

Related U.S. Application Data

(60) Provisional application No. 63/058,761, filed on Jul. 30, 2020.

(51) Int. Cl.
*H04W 74/0816* (2024.01)
*H04W 4/40* (2018.01)
(Continued)

(52) U.S. Cl.
CPC ......... *H04W 74/0816* (2013.01); *H04W 4/40* (2018.02); *H04W 72/02* (2013.01); *H04W 72/20* (2023.01); *H04W 74/0825* (2013.01)

(58) Field of Classification Search
CPC ... H04W 74/0816; H04W 4/40; H04W 72/02; H04W 72/20; H04W 74/0825;
(Continued)

(56) References Cited

U.S. PATENT DOCUMENTS

2020/0186290 A1 6/2020 Zhang et al.
2020/0351669 A1* 11/2020 Xu .................... H04W 72/56
(Continued)

FOREIGN PATENT DOCUMENTS

EP 3817428 A1 5/2021
GB 2577506 A 4/2020
(Continued)

OTHER PUBLICATIONS

International Search Report and Written Opinion—PCT/US2021/040687—ISA/EPO—dated Oct. 29, 2021 (205772WO).

*Primary Examiner* — Abdullahi Ahmed
(74) *Attorney, Agent, or Firm* — QUALCOMM Incorporated

(57) ABSTRACT

This disclosure provides systems, methods, and apparatuses, including computer programs encoded on computer storage media, for wireless communication. In one aspect of the disclosure, a method for wireless communication by a user equipment (UE) includes receiving a first message from a first device. The first device includes an originator of a first channel occupancy time (COT). The method may also include transmitting a second message including a source identity (ID) of the first device. Other aspects and features are also claimed and described.

28 Claims, 7 Drawing Sheets

(51) Int. Cl.
*H04W 72/02* (2009.01)
*H04W 72/20* (2023.01)
*H04W 74/0808* (2024.01)

(58) Field of Classification Search
CPC ............. H04W 74/0808; H04W 92/18; H04W 74/002; H04W 24/08; H04W 72/25
See application file for complete search history.

(56) References Cited

U.S. PATENT DOCUMENTS

| | | | |
|---|---|---|---|
| 2021/0105744 A1* | 4/2021 | Balasubramanian | ........................ H04L 1/1825 |
| 2021/0243799 A1* | 8/2021 | Garcia | ................ H04W 74/006 |
| 2022/0039161 A1* | 2/2022 | Zhang | ................... H04W 72/02 |
| 2022/0061095 A1* | 2/2022 | Xue | ...................... H04W 72/02 |
| 2022/0070925 A1* | 3/2022 | Liu | ....................... H04W 72/56 |
| 2022/0256539 A1* | 8/2022 | Xue | ...................... H04W 72/02 |
| 2022/0417988 A1* | 12/2022 | Wang | ................... H04W 72/40 |
| 2023/0064680 A1* | 3/2023 | Huang | .................. H04L 1/1848 |
| 2023/0354425 A1* | 11/2023 | Jeon | ...................... H04L 5/0048 |

FOREIGN PATENT DOCUMENTS

| WO | WO-2019214544 A1 | 11/2019 |
|---|---|---|
| WO | WO-2020024854 A1 | 2/2020 |

\* cited by examiner

CHANNEL OCCUPANCY TIME (COT) SHARING PROPAGATION

CROSS-REFERENCE TO RELATED APPLICATIONS

This application claims the benefit of U.S. Provisional Patent Application No. 63/058,761, entitled, "CHANNEL OCCUPANCY TIME (COT) SHARING PROPAGATION," filed on Jul. 30, 2020, which is expressly incorporated by reference herein in its entirety.

TECHNICAL FIELD

Aspects of the present disclosure relate generally to wireless communication systems, and more particularly, to channel occupancy time (COT) sharing propagation.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Vehicle-to-everything (V2X) technology enables sharing of information from a vehicle to another device or entity that may affect the vehicle, and vice versa. V2X technology is associated with a vehicular communication system that can include one or more aspects or types of communication, such as vehicle-to-vehicle (V2V), vehicle-to-infrastructure (V2I), vehicle-to-network (V2N), vehicle-to-pedestrian (V2P), vehicle-to-device (V2D), and vehicle-to-grid (V2G), as illustrative, non-limiting examples. V2X technology can utilize cellular based communication or wireless local area network communication. To illustrate, cellular V2X (C-V2X) is a 3rd Generation Partnership Project (3GPP) standard and uses 3GPP standardized 4G LTE or 5G mobile cellular connectivity to send and receive signals from a vehicle to other vehicles, pedestrians or to fixed objects such as traffic lights in its surroundings. As part of the 3GPP Release 14, C-V2X defines two transmission modes that, together, enable a broad range of use cases. Direct C-V2X, which includes vehicle-to-vehicle (V2V), vehicle-to-infrastructure (V2I), and vehicle-to-pedestrian (V2P), provides enhanced communication range and reliability in dedicated ITS 5.9 GHz spectrum that's independent of a cellular network, as well as network communications (V2N) in traditional mobile broadband licensed spectrum.

Cellular V2X communication typically occurs in a licensed spectrum, such as a sharing spectrum in a licensed cellular band, or a dedicated intelligent transportation system (ITS) spectrum. In the licensed cellular spectrum, V2X communications share an uplink spectrum in a cellular network. In a dedicated ITS spectrum, V2X communications may occur in a spectrum range which may be regionally defined. However, in some regions, a dedicated spectrum is not guaranteed due to scarcity of spectrum availability. Accordingly, it is conceivable that cellular V2X communications may be deployed in an unlicensed spectrum which may be shared by other technologies, such as wireless-fidelity (Wi-Fi).

Additional V2X use of the license spectrum may add additional traffic to the unlicensed spectrum, create additional competition for access to the unlicensed spectrum, and make accessing the unlicensed spectrum more difficult. For example, a transmitter UE that accessed a channel based on energy-detection based channel sensing (e.g., LBT based on clean channel assessment) may transmit only a couple of slots, depending on the packet size or requirement to quality of service. Accordingly, the per-device channel sensing or LBT may result in sub-optimal channel access design. As another example, every time a UE has data ready for transmission, the UE has to perform LBT to access the channel, which may cause waste of resource and delay, such as when LBT requires random back-off. Further, for V2X communication, a UE may adhere to a channel occupancy time (COT) requirement in which continuous occupation of the channel in time cannot exceed a limitation. Accordingly, channel access for V2X and sidelink communications in unlicensed spectrum is challenging considering the sharing of spectrum with other technologies as well as additional requirements, such as regulatory requirements.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving a first message from a first device. The first device includes an originator of a first channel occupancy time (COT). The method also includes transmitting a second message including a source identity (ID) of the first device.

Another innovative aspect of the subject matter described in this disclosure can be implemented in an apparatus, such as a UE. The apparatus includes a transceiver configured to receive a first message from a first device. The first device includes an originator of a first COT. The apparatus further includes at least one processor and a memory coupled with the at least one processor and storing processor-readable instructions that, when executed by the at least one processor, is configured to initiate transmission of a second message including a source ID of the first device.

Another innovative aspect of the subject matter described in this disclosure can be implemented in an apparatus configured for wireless communication. The apparatus includes means for receiving a first message from a first device. The first device includes an originator of a first COT. The apparatus also includes means for transmitting a second message including a source ID of the first device.

Another innovative aspect of the subject matter described in this disclosure can be implemented in a non-transitory computer-readable medium storing instructions that, when executed by a processor, cause the processor to perform operations including transmitting a second message including a source ID of the first device. The operations further include initiating transmission of a second message including a source ID of the first device.

In an additional aspect of the disclosure, an apparatus configured for wireless communication is disclosed. The apparatus includes an interface configured for wireless communication and a processor system coupled to the interface. The processor system is configured to receive a first message from a first device. The first device includes an originator of a first COT. The interface is configured to transmit a second message including a source ID of the first device.

Another innovative aspect of the subject matter described in this disclosure can be implemented in a method of wireless communication performed by a UE. The method includes receiving a message including a source ID of a first device. The first device includes an originator of a COT. The method also includes determining whether to attempt access of a resource during the COT based on the source ID.

Another innovative aspect of the subject matter described in this disclosure can be implemented in an apparatus, such as a UE. The apparatus includes a transceiver configured to receive a message including a source ID of a first device. The first device includes an originator of a COT. The apparatus further includes at least one processor and a memory coupled with the at least one processor and storing processor-readable instructions that, when executed by the at least one processor, is configured to determine whether to attempt access of a resource during the COT based on the source ID.

Another innovative aspect of the subject matter described in this disclosure can be implemented in an apparatus configured for wireless communication. The apparatus includes means for receiving a message including a source ID of a first device. The first device includes an originator of a COT. The apparatus also includes means for determining whether to attempt access of a resource during the COT based on the source ID.

Another innovative aspect of the subject matter described in this disclosure can be implemented in a non-transitory computer-readable medium storing instructions that, when executed by a processor, cause the processor to perform operations including receiving a message including a source ID of a first device. The first device includes an originator of a COT. The operations further include determining whether to attempt access of a resource during the COT based on the source ID.

In an additional aspect of the disclosure, an apparatus configured for wireless communication is disclosed. The apparatus includes an interface configured for wireless communication and a processor system coupled to the interface receive a message including a source ID of a first device. The first device includes an originator of a COT. The interface is configured to receive. The processor system is configured to determine whether to attempt access of a resource during the COT based on the source ID.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
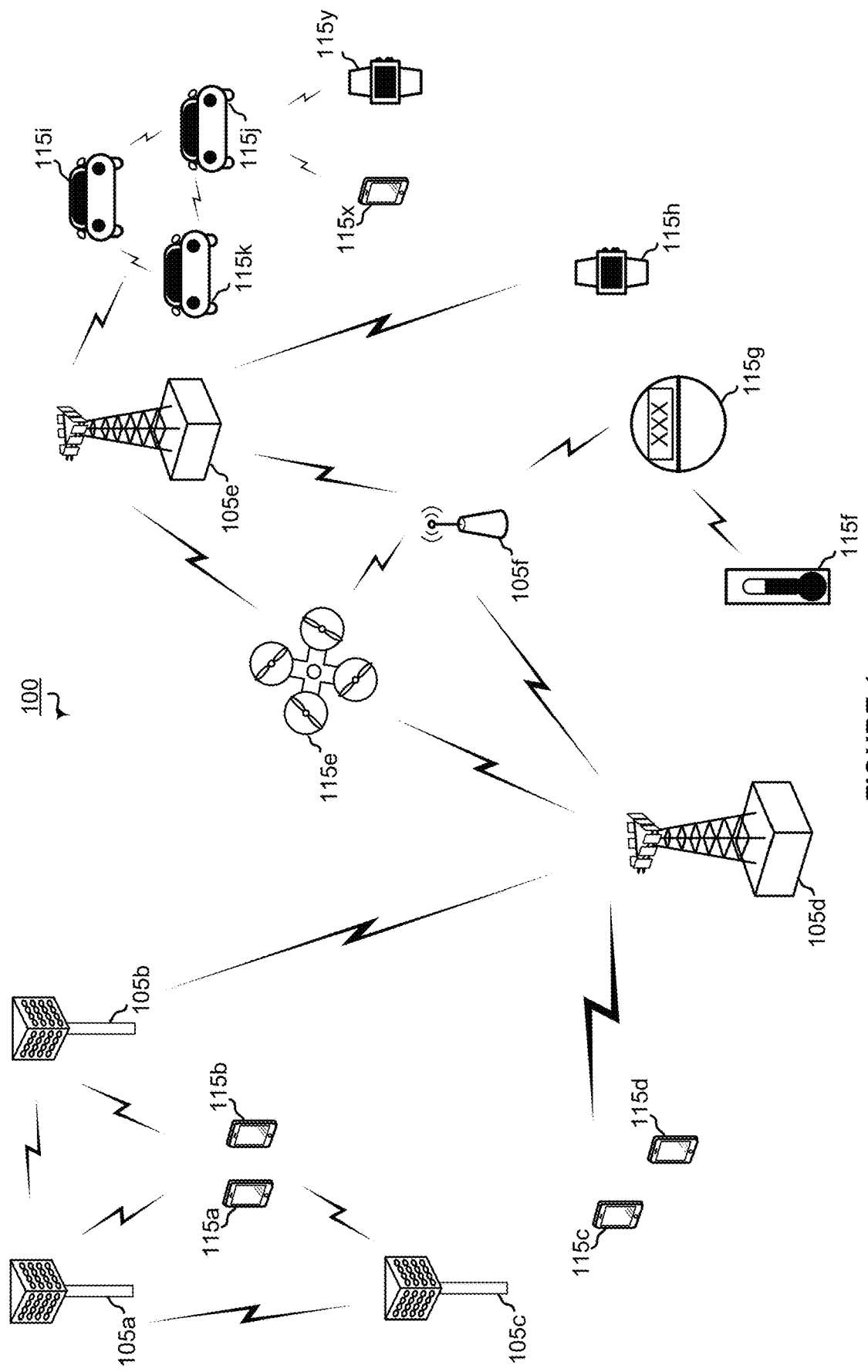
FIG. 1 is a block diagram illustrating details of an example wireless communication system.

The detailed description set forth below, in connection with the appended drawings, is intended as a description of various configurations and is not intended to limit the scope of the disclosure. Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for channel occupancy time (COT) sharing propagation. To illustrate, a first user equipment (UE) may originate a COT and may transmit a first message that includes sharing information associated with the COT and a source ID of the first UE. For example, the first message may include first sidelink control information (SCI). The first message may be received by a second UE and may be missed (e.g., not received) by a third UE. The second UE may transmit a second message to relay the sharing information to one or more other UEs, such as the third UE. The second message may include the sharing information and the source ID of the first UE. The third UE may receive the second message and identify the source ID of the first UE, the sharing information, or a combination thereof. The third UE may determining whether to attempt access of a resource during the COT based on the received second message. For example, the third UE may determine to attempt access to the resource based on a distance (e.g., an absolute physical distance or relative physical distance), a signal strength (e.g., a reference signal received power (RSRP), a received signal strength indicator (RSSI), or a pathloss based on sidelink measurements between the third UE and the first UE), an energy detection (ED) value, or a combination thereof. To illustrate, the third UE may compare the distance, the signal strength, or the ED value to one or more thresholds to determine whether to attempt to access the resource during the COT.

In some implementations, the third UE may determine or identify, based on whether the third UE received the first message directly from the first device, a set of conditions to be satisfied in order for the third UE to attempt access of the first resource during the first COT. For example, if the third UE did not receive the first message directly from the first UE, the set of conditions may indicate that the third UE needs to satisfy a first distance requirement (e.g., a first distance threshold), a first signal strength requirement (e.g., a first signal strength threshold), a first ED requirement (e.g., a first ED threshold), or a combination thereof. Alternatively, if the third UE received the first message directly from the first UE, the set of conditions may indicate that the UE needs to satisfy a second distance requirement (e.g., a second distance threshold), a second signal strength requirement (e.g., a second signal strength threshold), a second ED requirement (e.g., a second ED threshold), or a combination thereof.

Particular implementations of the subject matter described in this disclosure can be implemented to realize one or more of the following potential advantages. In some aspects, the present disclosure provides COT sharing propagation. For example, the second UE may propagate the sharing information (e.g., COT sharing information) which may enable the third UE, or another device, that missed receiving the sharing information directly from the first UE (e.g., a COT originator) to still be able to attempt to access a resource during the COT.

This disclosure relates generally to providing or participating in authorized shared access between two or more wireless communications systems, also referred to as wireless communications networks. One or more aspects of the wireless communication networks described herein may be used or incorporated into a V2X system. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km2), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR. Additionally or alternatively, certain aspects of the apparatus and techniques described herein, such as LET implementations, 5G NR implementations, other wireless communication implementations, or a combination thereof, may be used for V2X communication.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects are described herein by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chip embodiments or other non-module-component based devices (such as end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice. It is intended that innovations described herein may be practiced in a wide variety of implementations, including both large/small devices, chip-level components, multi-component systems (such as RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e. Additionally, V2V mesh network may include or correspond to a vehicle-to-everything (V2X) network between UEs 115i-115k and one or more other devices, such as UEs 115x, 115y.

Figure 2:
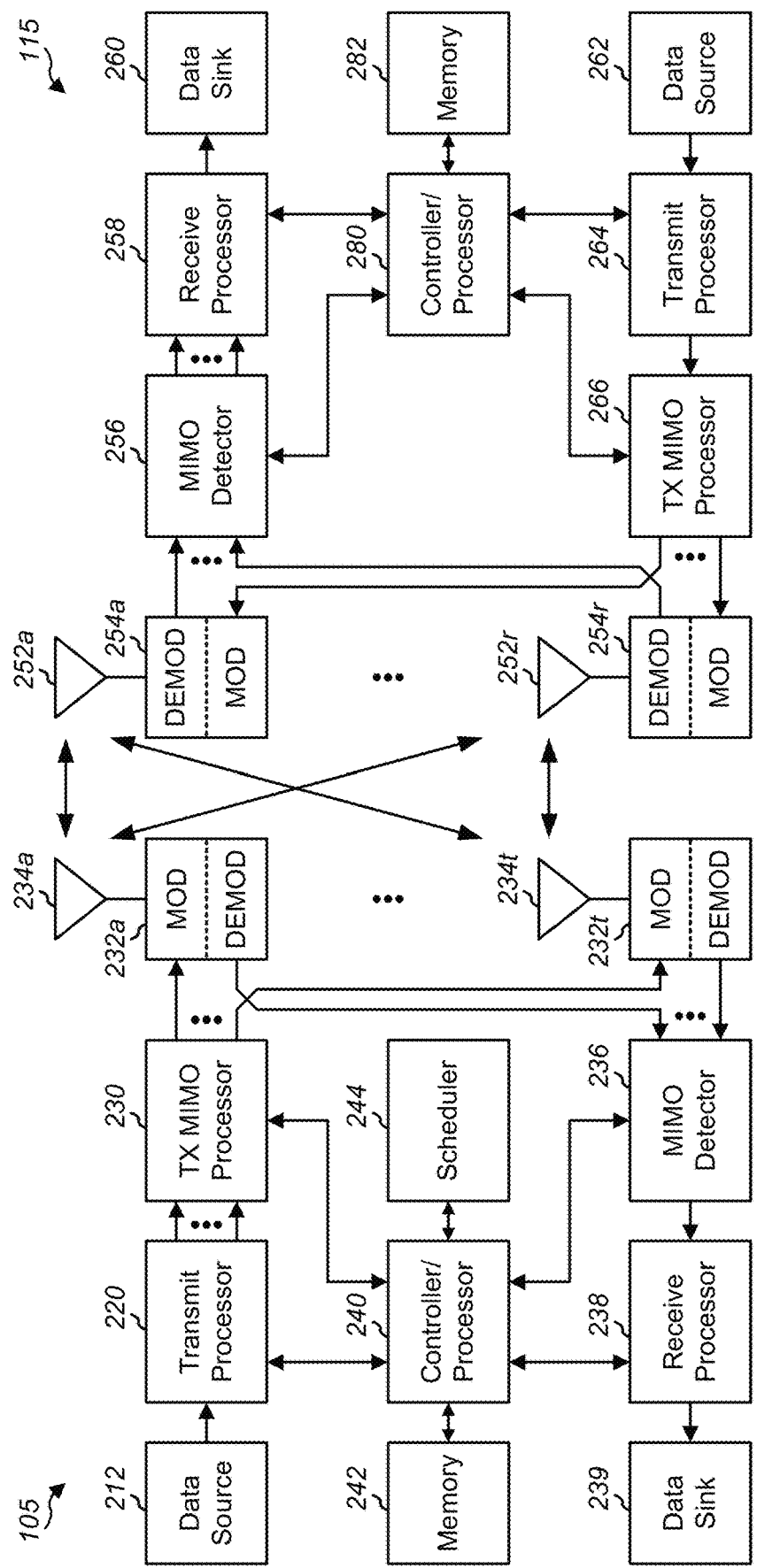
FIG. 2 is a block diagram conceptually illustrating an example design of a base station and a user equipment (UE).

FIG. 2 is a block diagram conceptually illustrating an example design of a base station 105 and a UE 115. Base station 105 and UE 115 may be one of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Additionally, base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process, such as encode and symbol map, the data and control information to obtain data symbols and control symbols, respectively. Additionally, transmit processor 220 may also generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for UE 115 to data sink 260, and provide decoded control information to controller/processor 280. For example, to process the detected symbols, the receive processor 258 may demodulate, deinterleave, and decode the detected symbols.

On the uplink, at UE 115, transmit processor 264 may receive and process data (such as for the physical uplink shared channel (PUSCH)) from data source 262 and control information (such as for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (such as for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3-8, or other processes for the techniques described herein. Memories 242 and 282 may store data and program codes for base station 105 and UE 115, respectively. Scheduler 244 may schedule UEs for data transmission on the downlink or uplink.

Wireless communications systems operated by different network operating entities (such as network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (such as time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed, such as contention-based, frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Existing V2X interface protocols provide for dynamic and configured grants for sidelinks (e.g., a PSCCH or PSSCH) using a PC5 interface. A DG may provide a one-time grant of sidelink resources, such as responsive to instantaneous demand/need for sidelink communication. A CG may provide a grant of sidelink resources enabling continued/periodic/repeated sidelink communication. A first type of sidelink resource grant (Type 1) of the V2X interface protocols uses RRC to configure a UE with resources of a CG. A second type of sidelink resource grant (Type 2) of the V2X interface protocols uses DCI over a PDCCH to configure a UE with resources of a DG or a CG. For example, the DCI may be a DG and provide allocation of resources to be used for sidelink communication. Alternatively, the DCI may be a CG and activate/deactivate a CG for sidelink communication.

Resource allocation for sidelink communication may be performed according to one or more modes, such as a first mode (Mode 1) or a second mode (Mode 2). In the first mode (Mode 1), a base station, a base station, such as a gNB, assigns one or more resources to be used by a TX UE and an RX UE. To illustrate, the base station may transmit DCI in the Uu interface to the TX UE to grant the one or more resources to the TX UE for sideline communication. In the second mode (Mode 2), the TX UE autonomously selects the one or more resources for the sidelink communication—i.e., the base station does not assign the one or more resources. Operation of an RX UE may be the same for both the first mode (Mode 1) and the second mode (Mode 2).

Figure 3A:
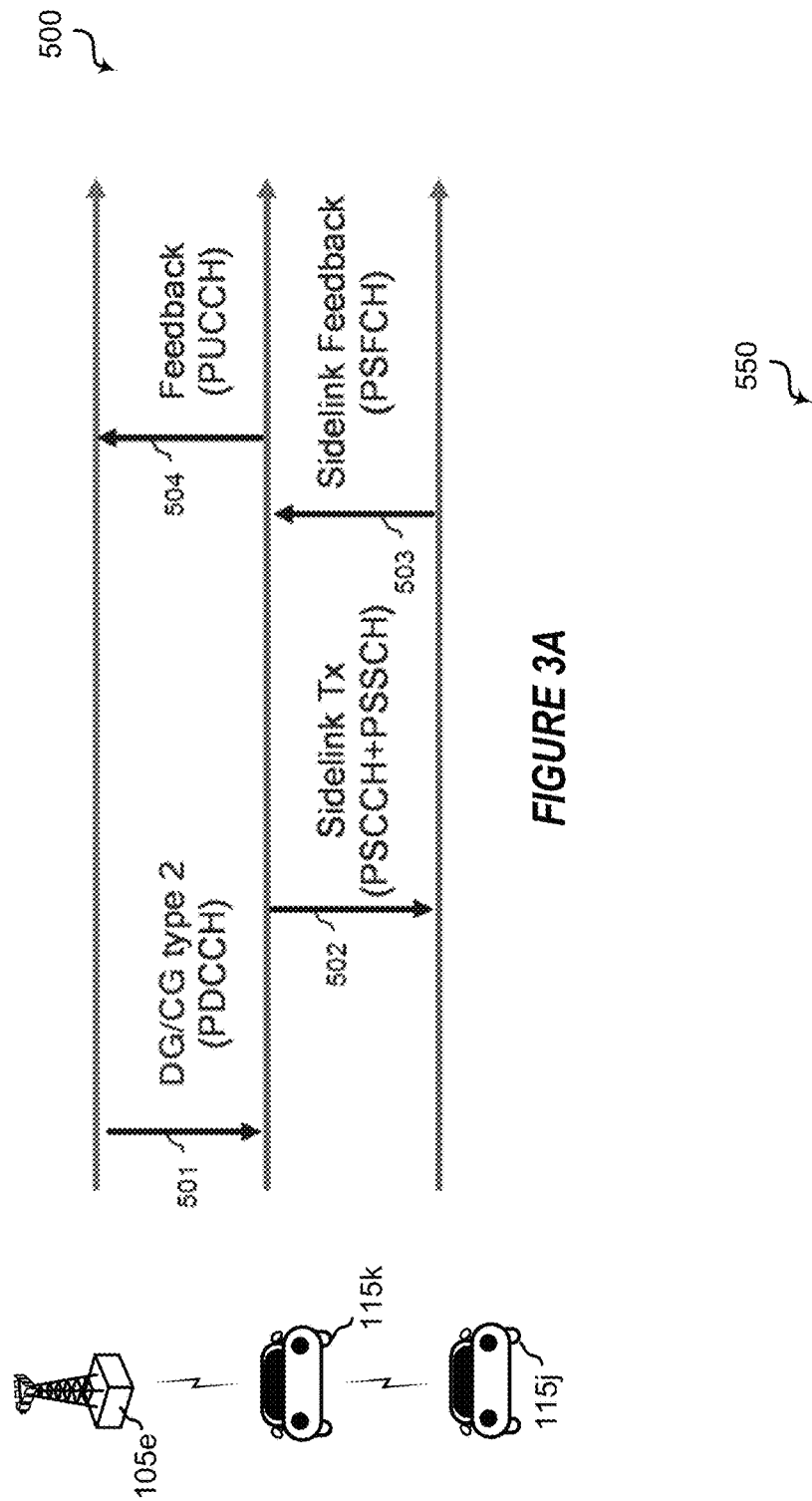
FIG. 3A is a mode 1 physical-layer procedure flow for sidelink resource grants in accordance with vehicle-to-everything (V2X) interface dynamic grant (DG)/configured grant (CG) Type 2 protocols.

FIG. 3A illustrates a Mode 1 physical-layer procedure flow (procedure flow 500) for sidelink resource grants in accordance with the above mentioned V2X interface DG/CG Type 2 protocols. Procedure flow 500 of FIG. 3A is described with reference to a V2X mesh network between UEs 115j and 115k communicating with macro base station 105e, as shown in wireless network 100 of FIG. 1. It should be understood, however, that the procedure flow may be implemented with respect to various UEs and UE configurations.

The procedure flow 500 may be an example of the first mode (Mode 1) in which resource allocation of Tx resources for sidelink communications is performed by the base station 105e through DCI 3_0. DCI 3_0 may be transmitted by the base station 105e to allocation time and frequency resources and may indicate transmission timing. The first mode (Mode 1) may support dynamic grants (DG), configured grants (CG) type 1, and CG type 2. CG type 1 may be activated via RRC signaling from the base station 105e. MCS may be decided by the TX UE, such as UE 115k, within a limit set by the base station 105e.

In procedure flow 500 of FIG. 3A, base station 105a uses DCI, provided according to DCI format 3_0 and which is configured to correspond to UE 115k (e.g., sidelink TX UE), to deliver a DG/CG Type 2 to UE 115k at procedure 501. DCI format 3_0 provides fields for time gap, hybrid automatic repeat request (HARQ) process identification, new data indicator, lowest index of the subchannel allocation to the initial transmission, first-stage SCI format 0-1 fields (including frequency resource assignment and time resource assignment), physical sidelink feedback channel (PSFCH) to HARQ feedback timing indicator, and PUCCH resource indicator, as well as configuration index in the case of CG. Base station 105a prepares the DCI with a sidelink-radio network temporary identifier (SL-RNTI) for UE 115, in the case of DG, or sidelink-configured scheduling-radio network temporary identifier (SL-CS-RNTI) for UE 115k, in the case of CG, to configure the DCI to correspond to UE 115k. In particular, the cyclic redundancy check (CRC) of the DCI is scrambled by SL-RNTI or SL-CS-RNTI for UE 115k in order to deliver a DG/CG Type 2 to the UE (e.g., sidelink TX UE).

In the case of CG, UE 115k (e.g., sidelink TX UE) reports the activation (or deactivation) of a sidelink (not shown in procedure flow 500). In particular, activation/deactivation of a CG sidelink is reported through media access control-control element (MAC-CE). MAC-CE reporting is also used by UE 115k to provide sidelink buffer status reports (BSRs) to base station 105e. For example, UE 115k may have provided a BSR indicating data for sidelink communication is contained in the UE buffer, resulting in initiating the sidelink resource grant of procedure 501.

At procedure 502 of procedure flow 500, UE 115k (e.g., sidelink TX UE) uses SCI, provided according to SCI format 0-1 (e.g., for scheduling physical sidelink shared channel (PSSCH) and second-stage SCI on PSSCH) and SCI format 0-2 (e.g., for decoding PSSCH) to schedule PSSCH and transmits data through PSSCH to UE 115j (e.g., sidelink receiver (RX) UE) according to the DG/CG Type 2 (sidelink resource grant of procedure 501). SCI format 0-1 provides fields for priority, frequency resource assignment, time resource assignment, resource reservation period, demodulation reference signal (DMRS) pattern, second-stage SCI format (broadcast, unicast, groupcast), Beta offset indicator, number of DMRS port, modulation and coding scheme (MCS), and a reserved field. SCI format 0-2 provides fields for HARQ process identification, new data indicator, redundancy version, source identification, destination identification, and channel state information (CSI) request, also if the second-stage SCI format field in the corresponding SCI provided in SCI format 0-1 indicates type 1 groupcast zone identification and communication range requirement fields are present. MCS selection is up to the sidelink TX UE (e.g., UE 115k in procedure flow 500), within limits set by the base station (e.g., base station 105e).

It can be seen from the foregoing that the base station schedules node resources for the sidelink TX UE (procedure 501) and the sidelink TX UE implements one or more sidelinks with sidelink RX UEs using some or all of the scheduled resources (procedure 502). However, the base station does not control how the sidelink TX UE uses the resources and which UEs are selected as the sidelink RX UEs by the sidelink TX UE. The existing V2X do not enable a base station making a sidelink resource grant to a sidelink TX UE to schedule sidelink resources for a specific sidelink (e.g., a sidelink between that sidelink TX UE and a specified sidelink RX UE). Additionally, existing V2X may provide a single grant for a single sidelink communication, such as a single sidelink unicast communication.

Continuing with procedure flow 500 of FIG. 3A, UE 115j (e.g., sidelink RX UE) provides sidelink feedback to UE 115k (e.g., sidelink TX UE) at procedure 503. In particular, UE 115j sends ACK/NACK on PSFCH upon receiving each transmission according to DG/CG Type 2.

At procedure 504 of procedure flow 500, UE 115k (e.g., sidelink TX UE) forwards the sidelink feedback provided by UE 115j (e.g., sidelink RX UE) to base station 105e. In particular, UE 115k forwards the ACK/NACK received from UE 115j to base station 105e on PUCCH.

Figure 3B:
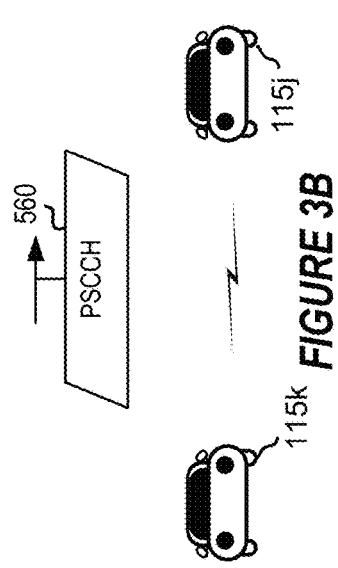
FIG. 3B is a mode 2 physical-layer procedure flow for sidelink communication.

FIG. 3B illustrates a Mode 2 physical-layer procedure flow (procedure flow 550) for sidelink resource grants in accordance with the above mentioned V2X interface. Procedure flow 550 of FIG. 3B is described with reference to a V2X mesh network between UEs 115j and 115k. It should be understood, however, that the procedure flow may be implemented with respect to various UEs and UE configurations.

In the second mode (Mode 2), the TX UE 115k performs channel sensing by blindly decoding all PSCCH channels and identifies reserved resources by other sidelink transmissions. The TX UE 115k reports available resources to an upper layer (of the TX UE 115k) and the upper layer decides resource usage.

In procedure flow 550 of FIG. 3B, after a decision of the resource usage, the TX UE 115k transmits a PSCCH 560. The PSCCH 560 may also include sidelink control information (SCI), such as SCI 0_1. The SCI may include information about a bandwidth, one or more resource reservations, COT information, COT sharing information, a source ID of TX UE 115k, or a combination thereof.

Additionally, in the procedure flow 550, the RX UE 115j performs blind decoding of one or more subchannels to detect the PSCCH 560. In the procedure flow 550, after transmitting the PSCCH 560, the TX UE 115k may transmit a PSSCH (not shown) to the RX UE 115j. In some implementations, the PSCCH 560 and PSSCH are transmitted within a same slot. The PSSCH may include SCI that includes or indicates a source ID (associated with the TX UE 115k) and a destination ID (associated with the RX UE 115j), which are used to distinguish whether the packet is for the RX UE 115j and coming from which TX UE. After transmission of the PSSCH by the TX UE 115k, the RX UE 115j may transmit PSFCH to the TX UE 115k.

The present disclosure provides systems, apparatus, methods, and computer-readable media for COT sharing propagation. To illustrate, a first UE may originate a COT and may transmit a first message that includes sharing information associated with the COT and a source ID of the first UE. For example, the first message may include first SCI. The first message may be received by a second UE and may be missed (e.g., not received) by a third UE. The second UE may transmit a second message to relay the sharing information to one or more other UEs, such as the third UE. The second message may include the sharing information and the source ID of the first UE. The third UE may receive the second message and identify the source ID of the first UE, the sharing information, or a combination thereof. The third UE may determining whether to attempt access of a resource during the COT based on the received second message. For example, the third UE may determine to attempt access to the resource based on a distance (e.g., an absolute physical distance or relative physical distance), a signal strength (e.g., an RSRP, an RSSI, or a pathloss based on sidelink measurements between the third UE and the first UE), an ED value, or a combination thereof. To illustrate, the third UE may compare the distance, the signal strength, or the ED value to one or more thresholds to determine whether to attempt to access the resource during the COT.

In some implementations, the third UE may determine or identify, based on whether the third UE received the first message directly from the first UE, a set of conditions to be satisfied in order for the third UE to attempt access of the first resource during the first COT. For example, if the third UE did not receive the first message directly from the first UE, the set of conditions may indicate that the third UE needs to satisfy a first distance requirement (e.g., a first distance threshold), a first signal strength requirement (e.g., a first signal strength threshold), a first ED requirement (e.g., a first ED threshold), or a combination thereof. Alternatively, if the third UE received the first message directly from the first UE, the set of conditions may indicate that the UE needs to satisfy a second distance requirement (e.g., a second distance threshold), a second signal strength requirement (e.g., a second signal strength threshold), a second ED requirement (e.g., a second ED threshold), or a combination thereof.

Particular implementations of the subject matter described in this disclosure can be implemented to realize one or more of the following potential advantages. In some aspects, the present disclosure provides COT sharing propagation. For example, the second UE may propagate the sharing information (e.g., COT sharing information) which may enable the third UE, or another device, that missed receiving the sharing information directly from the first UE (e.g., a COT originator) to still be able to attempt to access a resource during the COT.

Figure 4:
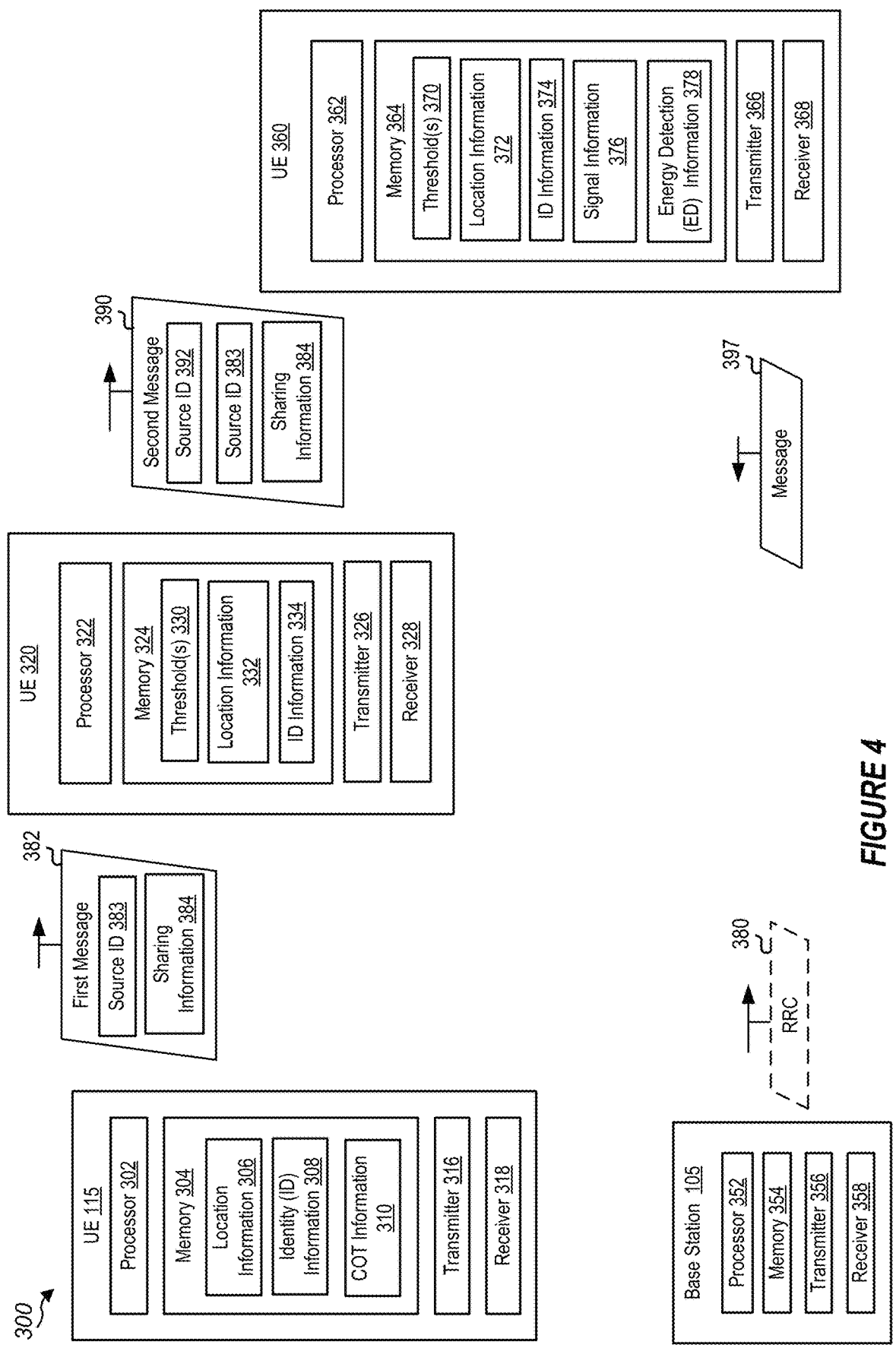
FIG. 4 is a block diagram illustrating an example wireless communication system for channel occupancy time (COT) sharing propagation.

FIG. 4 is a block diagram of an example wireless communications system 300 for V2X message communication. In some examples, wireless communications system 300 may implement aspects of wireless network 100. Wireless communications system 300 includes the UE 115, the base station 105, a UE 320, and a UE 360. UE 115, 320, or 360 may include or correspond to V2X entity, such as UEs 115i, 115j, or 115k to FIG. 1. Although three UEs and one base station are illustrated, in some other implementations, wireless communications system 300 may generally include fewer or more than three UEs and may include more than one base station or no base station.

In some implementations, wireless communication system 300 includes a V2X wireless communication system or an industrial Internet of things (IIoT) wireless communication system. V2X is a communication system in which information is passed between a vehicle and other entities within the wireless communication network that provides the V2X services. The V2X services may include services for Vehicle-to-Vehicle (V2V), Vehicle-to-Pedestrian (V2P), Vehicle-to-Infrastructure (V2I), and Vehicle-to-Network (V2N). One or more V2X standards aim to develop or support an Advanced Driver Assistance System (ADAS), which assist a driver with critical decisions, such as lane changes, speed changes, overtaking speeds, etc. Low latency communications may be used in V2X and, are therefore suitable for precise positioning. For example, positioning techniques, such as time of arrival (TOA), time difference of arrival (TDOA) or observed time difference of arrival (OTDOA), or any other cellular positioning technique, may be enhanced using assistance from V2X. The V2X wireless communication system can utilize cellular based communication or wireless local area network communication. To illustrate, cellular V2X (C-V2X) is a 3rd Generation Partnership Project (3GPP) standard and uses 3GPP standardized 4G LTE or 5G mobile cellular connectivity to send and receive signals from a vehicle to other vehicles, pedestrians or to fixed objects such as traffic lights in its surroundings.

In general, there are two modes of operation for V2X services, as defined in Third Generation Partnership Project (3GPP) TS 23.285. One mode of operation uses direct wireless communications between V2X entities when the V2X entities are within range of each other. The other mode of operation uses network based wireless communication between entities. The two modes of operation may be combined or other modes of operation may be used if desired.

The wireless communication of a V2X wireless communication system may be over Proximity-based Services (ProSe) Direction Communication (PC5) reference point as defined in 3GPP TS 23.303, and may use wireless communications under Institute of Electrical and Electronics Engineers (IEEE) 1609, Wireless Access in Vehicular Environments (WAVE), Intelligent Transport Systems (ITS), and IEEE 802.11p, on the ITS band of 5.9 GHz, or other wireless connections directly between entities.

The UE 115, such as a first UE, can include a variety of components (such as structural, hardware components) used for carrying out one or more functions described herein. For example, these components can include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, the UE 115 may also include one or more additional components, such as a modems. The processor 302 may be configured to execute instructions stored in the memory 304 to perform the operations described herein. In some implementations, the processor 302 includes or corresponds to one or more of the receive processor 258, the transmit processor 264, and the controller/processor 280, and the memory 304 includes or corresponds to the memory 282.

Memory 282 includes location information 306, ID information 308, and COT information 310. The location information 312 may indicate a location of the UE 115, a location of another UE, or a combination thereof. The one or more locations included in the location information 312 may be represented as a coordinates, a region or region ID, a zone or zone ID, or a combination thereof. For example, the UE 115 may include a global positioning system (GPS) configured to determine a latitude, a longitude, elevation, or a combination thereof, of the UE 115. To illustrate, the location may be a Global Navigation Satellite System (GNSS) location.

The ID information 308 may include a source ID of the UE 115, the base station 105, one or more other UEs, such as the UE 320, the UE 360, or a combination thereof. The COT information 310 indicates a bandwidth or channel associated with a COT, a start time/position of the COT, a duration of the COT, an end time/position of the COT, or a combination thereof.

The transmitter 316 is configured to transmit data to one or more other devices, and the receiver 318 is configured to receive data from one or more other devices. For example, the transmitter 316 may transmit data to, and the receiver 318 may receive data from, the base station 105 or the UEs 320 or 360. In some implementations, the transmitter 316 and the receiver 318 may be integrated in one or more transceivers. Additionally, or alternatively, the transmitter 316, the receiver 318, or both may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). The processor 352 may be configured to execute instructions stored in the memory 354 to perform the operations described herein. In some implementations, the processor 352 includes or corresponds to one or more of the receive processor 238, the transmit processor 220, and the controller/processor 240, and the memory 354 includes or corresponds to the memory 242.

The transmitter 356 is configured to transmit data to one or more other devices, and the receiver 358 is configured to receive data from one or more other devices. For example, the transmitter 356 may transmit data to, and the receiver 358 may receive data from, the UEs 115, 320, or 360. In some implementations, the transmitter 356 and the receiver 358 may be integrated in one or more transceivers. Additionally, or alternatively, the transmitter 356, the receiver 358, or both may include or correspond to one or more components of base station 105 described with reference to FIG. 2.

The UE 320, such as a second UE, can include a variety of components (such as structural, hardware components) used for carrying out one or more functions described herein. For example, these components can include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 368"). In some implementations, the UE 320 may include one or more additional components, such as a sensor (e.g., a temperature sensor) and a modem, as illustrative, non-limiting examples. The processor 322 may be configured to execute instructions stored in the memory 324 to perform the operations described herein. In some implementations, the processor 322 includes or corresponds to one or more of the receive processor 258, the transmit processor 264, and the controller/processor 280, and the memory 324 includes or corresponds to the memory 282.

The memory 324 includes one or more thresholds 330 (hereinafter referred to collectively as "threshold 330"), location information 332, and ID information 334. The threshold 330 may include one or more distance thresholds, one or more signal strength thresholds, one or more energy detection (ED) thresholds, one or more one or more temperature thresholds, one or more other thresholds, or a combination thereof, as illustrative, non-limiting examples.

The location information 332 may include or correspond to the location information 306. For example, the location information 332 may include or indicate a location of the base station 105, UE 115, 320, or 360, or a combination thereof. In some implementations, the UE 320 may include a global positioning system (GPS) configured to determine a latitude, a longitude, elevation, or a combination thereof, of the UE 320. To illustrate, the location may be a Global Navigation Satellite System (GNSS) location. The ID information 334 may include or correspond to the ID information 308. The ID information 334 may include a source ID of the UE 320, the base station 105, one or more other UEs, such as the UE 115, the UE 360, or a combination thereof.

The transmitter 326 is configured to transmit data to one or more other devices, and the receiver 328 is configured to receive data from one or more other devices. For example, the transmitter 326 may transmit data to, and the receiver 328 may receive data from, the base station 105 or the UEs 115 or 360. In some implementations, the transmitter 326 and the receiver 328 may be integrated in one or more transceivers. Additionally, or alternatively, the transmitter 326, the receiver 328, or both may include or correspond to one or more components of the UE 115 described with reference to FIG. 2.

The UE 360, such as a third UE, can include a variety of components (such as structural, hardware components) used for carrying out one or more functions described herein. For example, these components can include one or more processors 362 (hereinafter referred to collectively as "processor 362"), one or more memory devices 364 (hereinafter referred to collectively as "memory 364"), one or more transmitters 366 (hereinafter referred to collectively as "transmitter 366"), and one or more receivers 368 (hereinafter referred to collectively as "receiver 368"). In some implementations, the UE 320 may include one or more additional components, such as a sensor (e.g., a temperature sensor) and a modem, as illustrative, non-limiting examples. The processor 362 may be configured to execute instructions stored in the memory 364 to perform the operations described herein. In some implementations, the processor 362 includes or corresponds to one or more of the receive processor 258, the transmit processor 264, and the controller/processor 280, and the memory 364 includes or corresponds to the memory 282.

The memory 464 includes one or more thresholds 370 (hereinafter referred to collectively as "threshold 370"), location information 372, ID information 374, signal information 376, and ED information 378. The threshold 370 may include or correspond to the threshold 330. The threshold 370 may include one or more distance thresholds, one or more signal strength thresholds, one or more energy detection (ED) thresholds, one or more one or more temperature thresholds, one or more other thresholds, or a combination thereof, as illustrative, non-limiting examples. The one or more distance thresholds may include an absolute distance threshold, such as a distance value having units of meters or feet, or a relative distance threshold, such as a number of zones. In some implementations, the relative distance threshold may be set such that two devices need to be in the same zone, in neighboring zones, or adjacent zones.

The location information 372 may include or correspond to the location information 306 or 332. For example, the location information 372 may include or indicate a location of the base station 105, UE 115, 320, or 360, or a combination thereof. In some implementations, the UE 360 may include a global positioning system (GPS) configured to determine a latitude, a longitude, elevation, or a combination thereof, of the UE 360. To illustrate, the location may be a Global Navigation Satellite System (GNSS) location. The ID information 374 may include or correspond to the ID information 308 or 334. The ID information 374 may include a source ID of the UE 360, the base station 105, one or more other UEs, such as the UE 115, the UE 320, or a combination thereof.

The signal information 376 may indicate a signal strength (e.g., a reference signal received power (RSRP), a received signal strength indicator (RSSI), or a pathloss based on sidelink measurements between two UEs, such as the UE 115 and the UE 360. The ED information 378 may indicate an ED value determined based on an ED operation.

The transmitter 366 is configured to transmit data to one or more other devices, and the receiver 368 is configured to receive data from one or more other devices. For example, the transmitter 366 may transmit data to, and the receiver 368 may receive data from, the base station 105 or the UEs 115 or 320. In some implementations, the transmitter 366 and the receiver 368 may be integrated in one or more transceivers. Additionally, or alternatively, the transmitter 366, the receiver 368, or both may include or correspond to one or more components of the UE 115 described with reference to FIG. 2.

In some implementations, a UE, such as UE 115, 320, or 360, may include or correspond to a road side unit (RSU). The RSU may include a stationary infrastructure entity supporting V2X applications that can exchange messages with other entities supporting V2X applications. An RSU may be a logical entity that may combine V2X application logic with the functionality of an eNB (referred to as eNB-type RSU) or UE (referred to as UE-type RSU).

In some implementations, the wireless communications system 300 implements a 5G New Radio (NR) network. For example, the UE 115 may include 5G-capable UEs and 5G capable base stations, such as UEs and base stations configured to operate in accordance with a 5G NR network protocol such as that defined by the 3rd Generation Partnership Project (3GPP).

Multiple UEs may share a set of resources in unlicensed spectrum for sidelink communication. The set of resources may be resources in or during a COT. The COT may span multiple slots and include of a number of resource blocks in frequency. A COT may be initiated by a UE or a network node (e.g., a UE, a base station, roadside unit (RSU)) may initiate a COT based on LBT. COT sharing can allow better medium access in sidelink communications as the transmission within the COT does not have to use type 1 LBT For example, the COT originator performs Type 1 LBT and a device that shares the COT can use Type 2 LBT, which is less stringent than Type 1 LBT, to access the COT. However, COT sharing may cause problems in a distributed system (e.g., Mode 2 V2X communication). For example, one problem can be the interference propagation in which a device that shares the COT begins transmission during the COT without type 1 LBT.

During operation of the wireless communications system 300, the UE 115, the UE 320, and the UE 360 may broadcast and receive messages from one or more of the other UEs. The UE 115 may access a resource and reserve the resource time period, such as a COT. Accordingly, the UE 115 may be an originator of the COT. The UE 115 may transmit a first message 382 that is associated with the COT to enable COT sharing by one or more other devices, such as one or more UEs. The first message 382 may include a source ID 383 of the UE 115 and sharing information 384. The source ID 383 may be associated with the ID information 308 and the sharing information 384 may be associated with the COT information 310. In some implementations, the first message 382 may include or correspond to first SCI. Additionally, or alternatively, the first message 382 may include location information, a threshold, or a combination thereof. The location information may include or correspond to the location information 306, and the threshold may include one or more ED thresholds. In some implementations, the one or more ED thresholds may establish a COT sharing range associated with the COT.

The first message 382 may be received by the UE 320 and may be missed (e.g., not received) by UE 360. To illustrate, the UE 360 may not receive the first message 382 because of interference or because the UE 360 was out or range to receive the first message 382, transmitting at the same time while the first message 382 was transmitted, or there was a collision with at least a portion (e.g., SCI) of the first message 382, or a combination thereof.

The UE 320 may transmit a second message 390 to propagate the sharing information 384 from the UE 115 (e.g., an originator of the COT) to one or more other UEs, such as the UE 360. For example, the second message 390 may include the sharing information 384, the source ID 383 of the UE 115, and a source ID 392 of the UE 320. For example, the source ID 383 may include one or more bits (e.g., 8 bits) on SCI—e.g., the SCI may be 40 bits, 48 bits, or another number of bits. In some implementations, the second message 390 may include or correspond to second SCI, such as SCI-2. Additionally, or alternatively, the second message 390 may include location information, a threshold, or a combination thereof. The location information may include or correspond to the location information 3332, and the threshold may include or correspond to the threshold 330. In some implementations, the second message 390 may include the ED threshold, such as the ED threshold from the UE 115. By propagating the sharing information 384, the UE 320 enables the UE 360 (which missed the first message 382) to have an opportunity to share the COT.

In some implementations, the UE 320 may determine whether the UE 320 is qualified to propagate the sharing information 384. For example, the UE 320 may determine whether it is qualified based on the ED threshold. To illustrate, the UE 320 may perform an ED operation to determine an ED value, and may compare the ED value to the ED threshold. The ED value may be determined prior to or subsequent to receipt of the first message 382. If the UE 320 satisfies the ED threshold (e.g., the UE 320 is at or within a sharing range), the UE 320 may propagate the sharing information 384. Alternatively, if the UE 320 does not satisfy the ED threshold (e.g., the UE 320 is outside of the sharing range), the UE 320 may not propagate the sharing information 384.

The UE 360 may receive the second message 390 and identify the source ID 383 of the UE 115, the sharing information 384, or a combination thereof. The UE 360 may determining whether to attempt access of the resource during the COT based on the received second message 390, such as based on the source ID 383 of the UE 115. For example, the UE 360 may determine to attempt access to the resource based on a distance (e.g., an absolute physical distance or relative physical distance), a signal strength (e.g., an RSRP, an RSSI, or a pathloss based on sidelink measurements between the UE 360 and the UE 115), an ED value, or a combination thereof. To illustrate, the UE 320 may compare the distance, the signal strength, or the ED value to one or more thresholds to determine whether to attempt to access the resource during the COT. The UE 360 may determine the distance between the UE 360 and the UE 115 based on the source ID 383 of the UE 115. For example, the UE 360 may access the location information 372 to determine location information of the UE 115. The location information of the UE 115 may have been received prior to receipt of the second message 390 or may be included in the second message. Additionally, or alternatively, the UE 360 may determine, based on the source ID 383 of the UE 115, the signal strength between the UE 360 and the UE 115. For example, the UE 360 may access the signal information 376 to determine the signal strength based on the source ID 383 or may measure the signal strength of a signal received from the UE 115 based on the source ID 383. To illustrate, the UE 360 may receive one or more communications from the UE 115 prior to the first message and may have determined a signal strength in relation to the UE 115 based on the one or more communications. The one or more communication from the UE 115 may include the source ID 838 of the UE 115, location information of the UE 115, or a combination thereof. Additionally, or alternatively, the UE 360 may determine and ED value by accessing the ED information 378 or by performing an ED operation.

In some implementations, the UE 360 may determine or identify, based on whether the UE 360 received the first message 382 directly from the UE 115, a set of conditions to be satisfied in order for the UE 360 to attempt access of the resource during the COT. For example, if the UE 360 did not receive the first message 382 directly from the UE 115, the set of conditions may indicate that the UE 360 is to satisfy a first distance requirement (e.g., a first distance threshold), a first signal strength requirement (e.g., a first signal strength threshold), a first ED requirement (e.g., a first ED threshold), or a combination thereof. Alternatively, if the UE 360 received the first message 382 directly from the UE 115, the set of conditions may indicate that the UE 360 is to satisfy a second distance requirement (e.g., a second distance threshold), a second signal strength requirement (e.g., a second signal strength threshold), a second ED requirement (e.g., a second ED threshold), or a combination thereof. To satisfy a distance requirement, the distance between the UE 360 and the COT originator (e.g., the UE 115) is less than or equal to a distance threshold. To satisfy a signal strength requirement, the signal strength between the UE 360 and the COT originator (e.g., the UE 115) is greater than or equal to a signal strength threshold. To satisfy an ED requirement, an ED value measured by the UE 360 is less than or equal to an ED threshold.

The UE 360 may attempt access of the resource during the COT. For example, the UE 360 attempt and acquire access of the resource and transmit a message 397 via the resource during the COT.

In some implementations, the base station 105 may transmit an RRC message 380 (represented as with a dashed line to indicate it is an optional message) that includes or indicates one or more thresholds, such as the threshold 330 or 370. The RRC message 380 may be received by one or more UEs, such as the UEs 115, 320, or 360.

In some implementations, an apparatus, such as the UE 320, includes a transceiver configured to receive the first message 382 from a first device, such as the UE 115. The first device includes an originator of a first COT. The apparatus further includes at least one processor (e.g., 322) and the memory 324 coupled with the at least one processor and storing processor-readable instructions that, when executed by the at least one processor, is configured to initiate transmission of the second message 390 including the source ID 383 of the first device.

In some implementations, an apparatus, such as the UE 360, includes a transceiver configured to receive a message (e.g., 390) including the source ID 383 of a first device, such as the UE 115. The first device includes an originator of a COT. The apparatus further includes at least one processor (e.g., 362) and the memory 364 coupled with the at least one processor and storing processor-readable instructions that, when executed by the at least one processor, is configured to determine whether to attempt access of a resource during the COT based on the source ID 383.

In some implementations of wireless communications system 300, one or more of UEs 115, 320, and 360 may include various forms of IoT devices, such as IIoT devices, in communication via wireless links of the wireless communications system 300. For example, the IIoT devices of some deployments may include sensors (e.g., position sensors, temperature sensors, pressure sensors, power sensors, motion detectors, proximity detectors, accelerometers, scanners, cameras, probes, switches, etc.), actuators (e.g., linear actuators, rotary actuators, servomechanism, solenoid, stepper motor, electric motor, comb drive actuators, etc.), or a combination thereof. A large number of IIoT devices may be in communication with a corresponding device, such as an industrial controller (e.g., computer, programmable logic controller (PLC), supervisory control and data acquisition (SCADA) system, etc.), of control network in an industrial environment, such as a manufacturing facility, materials processing facility, warehouse, etc. For example, a PLC may be in communication with 20-100 or more sensors and/or actuators (S/As), wherein 1-1000 such PLCs may be deployed throughout an industrial (e.g., manufacturing) facility.

Thus, FIG. 4 describes COT sharing propagation. For example, the UE 320 may propagate the sharing information 384 (e.g., COT sharing information) which may enable the UE 360, or another device, that missed receiving the sharing information 384 directly from the UE 115 (e.g., a COT originator) to attempt to access a resource during the COT.

Figure 5:
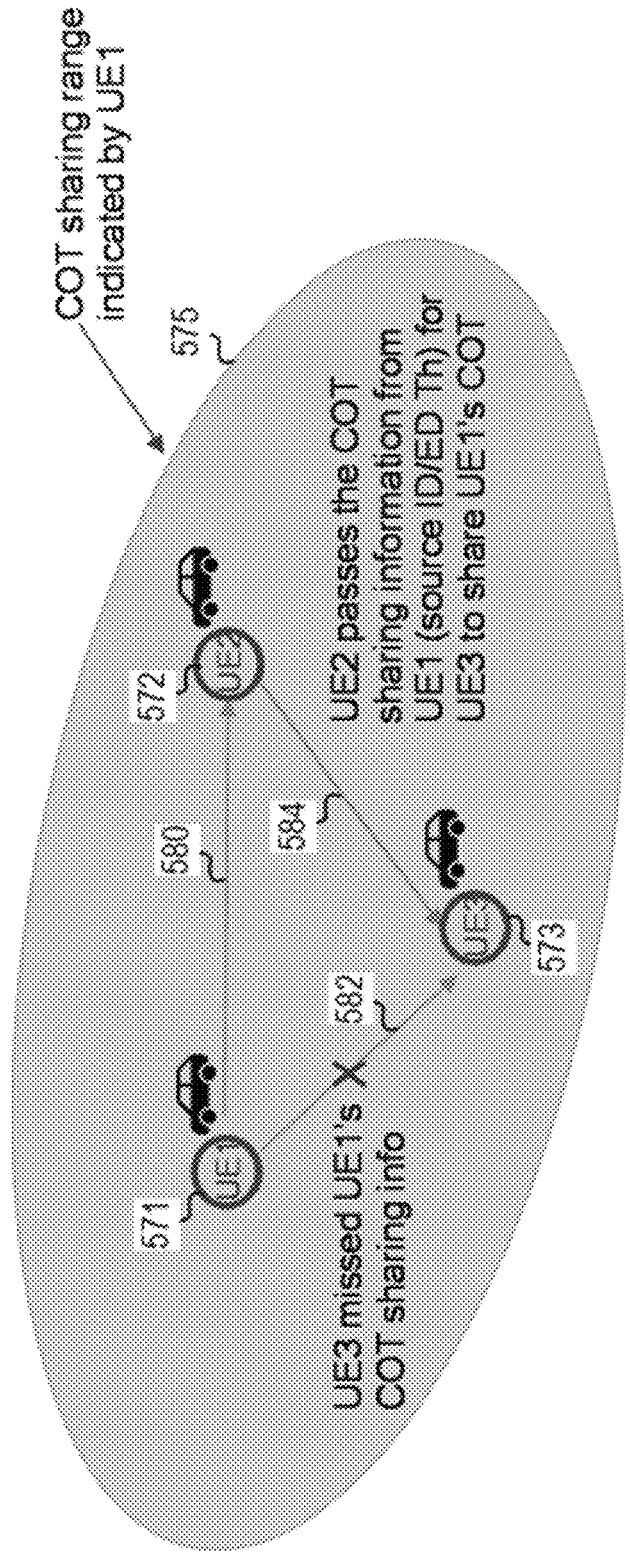
FIG. 5 is diagram illustrating an example of COT sharing propagation.

FIG. 5 is a is diagram illustrating an example of COT sharing propagation. A wireless communications system, such as the wireless communication system 300, for V2X message communication includes a first UE 571 (designated UE1), a second UE 572 (designated UE2), and a third UE 573 (designated UE 3). The first UE 571, the second UE 572, and the third UE 573 may include or correspond to the UE 115, the UE 320, and the UE 360, respectively.

The first UE 571 may originate a COT and may transmit (as indicated by arrows 580 and 582) a first message that includes sharing information associated with the COT and a source ID of the first UE 571. For example, the first message, the sharing information and the source ID may include or correspond to the first message 382, the sharing information 384, and the source ID 383. The first message may include first SCI. In some implementations, the first message may also indicate a COT sharing range 575. For example the COT sharing range 575 may correspond to an ED threshold indicated by the first message.

The first message may be received by the second UE 572, as indicated by a first arrow 580, and may be missed (e.g., not received) by the third UE 573, as indicated by a second arrow 582. The second UE 572 may transmit, as indicated by a third arrow 584, a second message to pass the sharing information from the first UE 571 (e.g., an originator of the COT) to one or more other UEs, such as the third UE 573. For example, the second message may include or correspond to the second message 390. The second message may include the sharing information and the source ID of the first UE. Additionally, or alternatively, the second message may include the ED threshold.

The third UE 573 may receive the second message and identify the source ID of the first UE 571, the sharing information, or a combination thereof. The third UE 573 may determining whether to attempt access of a resource during the COT based on the received second message. For example, the third UE 573 may determine to attempt access to the resource based on a distance (e.g., an absolute physical distance or relative physical distance), a signal strength (e.g., an RSRP, an RSSI, or a pathloss based on sidelink measurements between the third UE 573 and the first UE 571), an ED value, or a combination thereof. To illustrate, the third UE 573 may compare the distance, the signal strength, or the ED value to one or more thresholds to determine whether to attempt to access the resource during the COT.

In some implementations, the third UE 573 may determine or identify, based on whether the third UE 573 received the first message directly from the first UE 571, a set of conditions to be satisfied in order for the third UE 573 to attempt access of the resource during the COT. For example, if the third UE 573 did not receive the first message directly from the first UE 571, the set of conditions may indicate that the third UE 573 is to satisfy a first distance requirement (e.g., a first distance threshold), a first signal strength requirement (e.g., a first signal strength threshold), a first ED requirement (e.g., a first ED threshold), or a combination thereof. Alternatively, if the third UE 573 received the first message directly from the first UE 571, the set of conditions may indicate that the third UE 573 is to satisfy a second distance requirement (e.g., a second distance threshold), a second signal strength requirement (e.g., a second signal strength threshold), a second ED requirement (e.g., a second ED threshold), or a combination thereof.

Figure 6:
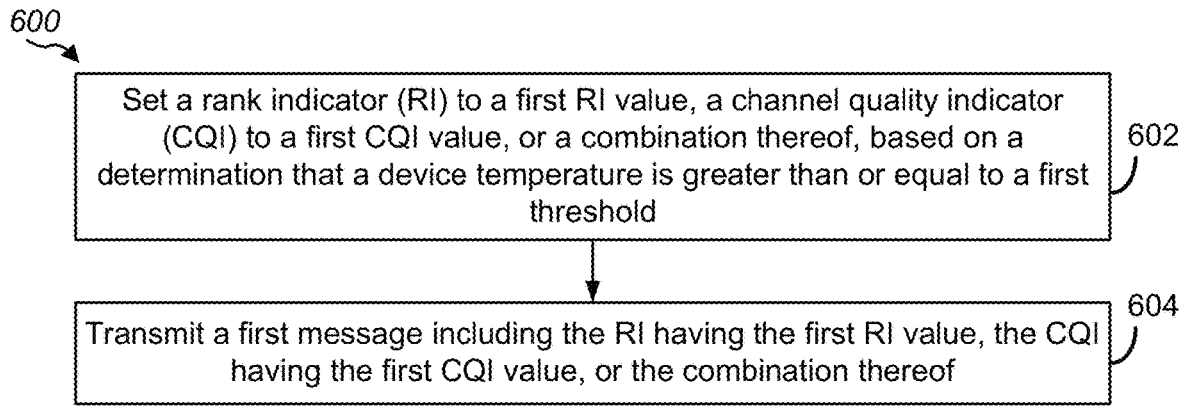
FIG. 6 is a flow diagram illustrating an example process of UE operations for communication.

FIG. 6 is a flow diagram illustrating an example process 600 of UE operations for communication. The UE may include or correspond to the UE 115 of FIG. 1, 2, 3A, 3B, or 4, the UEs 320, 360, a UE of FIG. 5, or another device, such as an RSU, a PLC, or an S/A device. The UE may be configured for V2X communication. For example, the V2X communication may include C-V2X communication.

As illustrated at block 602, the UE receives a first message from a first device, the first device includes an originator of a first COT. For example, the first message may include or correspond to the first message 382.

In some implementations, the first message includes first SCI from the first device. Additionally, or alternatively, the first message may include the source ID of the first device, sharing information associated with the first COT, location information associated with the first device, an indication of a threshold, or a combination thereof. The source ID of the first device and the sharing information associated with the first COT may include or correspond to the source ID 383 and the sharing information 384, respectively. The location information associated with the first device may include or correspond to the location information 306. For example, the location information may include coordinates associated with the first device, a zone identifier associated with the first device, or a combination thereof. The threshold may include or correspond to the threshold 330. In some implementations, the UE may detect, based on the first message, the source ID of the first device, the sharing information associated with the first COT, or a combination thereof.

At block 604, the UE transmits a second message including a source ID of the first device. For example, the second message may include or correspond to the second message 390. The source ID of the first device may include or correspond to the source ID 383.

In some implementations, the second message includes second SCI. Additionally, or alternatively, the second message may include a source ID of the UE, the sharing information associated with the first COT, the location information associated with the first device, an indication of a threshold, or a combination thereof. The source ID of the UE may include or correspond to the source ID 392. The threshold may include one or more distance thresholds, one or more signal strength thresholds, an ED threshold, or a combination thereof. The threshold may include or correspond to the threshold 330. In some implementations, the UE may receive an RRC message from a base station and the RRC message may include the indication of the threshold. For example, the RRC message and the base station may include or correspond to the RRC message 380 and the base station 105, respectively.

In some implementations, the UE determines whether to transmit the second message.

To determine whether to transmit the second message, the UE may determine an ED value, and performing a comparison based on the ED value and the threshold. A determination to transmit the second message may be based on a result of the comparison. In some additional implementations, the UE may select the threshold based a determination that the UE received the sharing information associated with the first COT directly from the first device. If the UE received the sharing information directly from the first device, the UE may select a first threshold. Alternatively, if the UE did not receive the sharing information directly from the first device, the UE may select a second threshold that is more restrictive than the first threshold.

In some implementations, after expiration of the first COT, the UE may receive, from a third device, a third message including a source ID of a fourth device and second sharing information associated with a second COT. The fourth device may include an originator of the second COT. The UE may determine whether to attempt access of a resource during the second COT based on the source ID of the fourth device. In some implementations, prior to receiving the third message, the UE may have missed receiving the second sharing information associated with the second COT directly from the fourth device.

Figure 7:
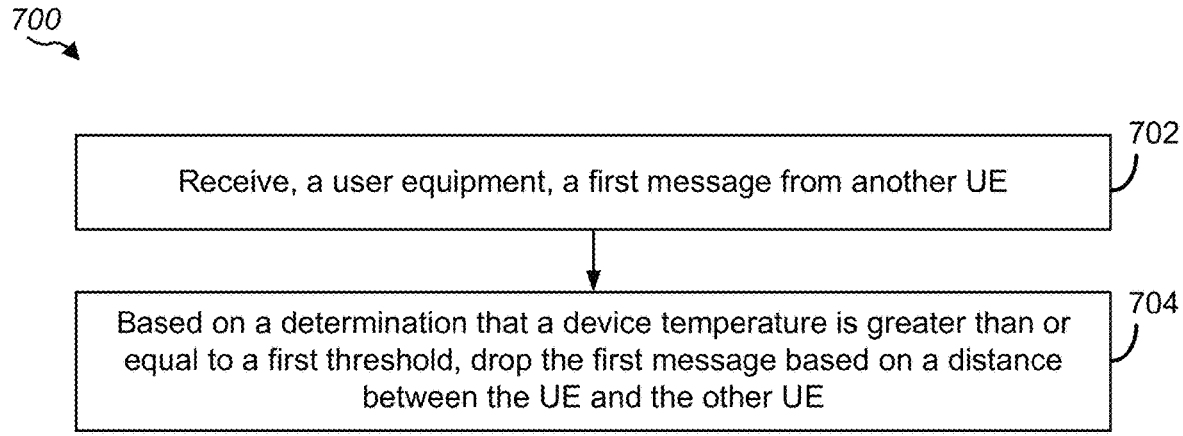
FIG. 7 is a flow diagram illustrating another example process of UE operations for communication.

FIG. 7 is a flow diagram illustrating an example process 700 of UE operations for communication is shown. The UE may include or correspond to the UE 115 of FIG. 1, 2, 3A, 3B, or 4, the UEs 320, 360, a UE of FIG. 5, or another device, such as an RSU, a PLC, or an S/A device. The UE may be configured for V2X communication. For example, the V2X communication may include C-V2X communication.

As illustrated at block 702, the UE receives a message including a source ID of a first device, the first device includes an originator of a first COT. For example, the message and the source ID may include or correspond to the second message 390 and the source ID 383, respectively. In some implementations, the message further includes sharing information associated with the first COT, location information, or a combination thereof. The sharing information associated with the first COT may include or correspond to the sharing information 384. The location information may include first coordinates of the first device, a first zone ID associated with the first device, or a combination thereof. For example, the location information may include or correspond to the location information 306, 332, or 372.

In some implementations, the UE determines the source ID of the first device based on the message, determines the sharing information associated with the first COT based on the message, or a combination thereof. Additionally, or alternatively, the UE may identify the first device based on the source ID of the first device.

In some implementations, the message is received from a second device and includes sidelink control information associated with the first device. For example, the sidelink control information may include or correspond to the first message 382 associated with the UE 115. Additionally, or alternatively, prior to receiving the message, the UE may have missed receiving the sidelink control information directly from the first device. For example, the UE may have missed receiving the first message 382 directly from the UE 115.

At block 704, the UE determines whether to attempt access of a first resource during the first COT based on the source ID. In some implementations, the UE may determine to attempt access of the first resource and may perform one or more operations to attempt to access the first resource during the first COT.

In some implementations, the UE determines a distance between the UE and the first device. The distance may be determined based on the location information. The distance may be an absolute distance or a relative distance. The UE may determine the distance based on first coordinates of the first device, a first zone ID associated with the first device, second coordinates of the UE, a second zone ID associated with the UE, or a combination thereof. In some implementations, the UE performs a first comparison based on the distance and a first threshold. The UE may determine whether to attempt access of the first resource during the first COT based on a result of the first comparison. For example, the UE may attempt access of the first resource during the first COT based on the distance satisfying the first threshold. To illustrate, the distance may satisfy the first threshold if the distance is less than or equal to the first threshold.

In some implementations, the UE determines a signal strength associated with the first device and the UE. For example, the signal strength may include or correspond to the signal information 376. In some implementations, the UE may measure, based on the source ID, one or more sideline communications between the first device and UE to determine the signal strength. The signal strength may be associated with a RSRP, a RSSI, or a pathloss. Additionally, or alternatively, the UE may perform a second comparison based on the signal strength and a second threshold. The UE may determine whether to attempt access of the first resource during the first COT based on a result of the second comparison. For example, the UE may attempt access of the first resource during the first COT based on the signal strength satisfying the second threshold. To illustrate, the signal strength may satisfy the second threshold if the signal strength is less than or equal to the second threshold.

In some implementations, the UE determines an ED value. The UE value may include or correspond to the ED information 378. The UE may perform a third comparison based on the ED value and an ED threshold. The ED threshold may include or correspond to the threshold 330 or 370. The ED threshold may be determined by the UE based on the message, an RRC message received by the UE, or a combination thereof. The RRC message may include or correspond to the RRC message 380. The UE may determine whether to attempt access of the first resource during the first COT based on a result of the third comparison. For example, the UE may attempt access of the first resource during the first COT based on the ED satisfying the ED threshold. To illustrate, the ED value may satisfy the ED threshold if the ED value is less than or equal to the ED threshold.

In some implementations, the UE receives one or more thresholds. The one or more threshold may include or correspond to the threshold 330 or 370. The one or more thresholds may include one or more distance thresholds, one or more signal strength thresholds, one or more ED thresholds, or a combination thereof. The UE may select at least one threshold of the one or more thresholds based on whether the UE received control information, such as sharing information or sidelink control information, directly from the first device. Additionally, or alternatively, the UE may determine or identify, based on whether the UE received the control information directly from the first device, a set of conditions to be satisfied in order for the UE to attempt access of the first resource during the first COT. For example, the set of conditions may indicate that the UE needs to satisfy a distance requirement (e.g., the first threshold), a signal strength requirement (e.g., the second threshold), or a combination thereof, and independent of an ED requirement (e.g., the ED threshold). As another example, the set of conditions may indicate that the UE needs to satisfy an ED requirement (e.g., the ED threshold), either solely in in combination with satisfying one of a distance requirement (e.g., the first threshold) or a signal strength requirement (e.g., the second threshold).

In some implementations, the UE receives a second message from a third device. The third device may include an originator of a second COT. The second message may include sidelink control information that includes a source ID of the third device and sharing information associated with the second COT. The UE may transmit a third message including a source ID of the UE, the source ID of the third device, the sharing information associated with the second COT, or a combination thereof.

Thus, each of the processes of FIGS. 6 and 7 enables the UE to perform COT sharing propagation operations. By propagating COT sharing, such as COT sharing information, as described herein, the one or more UEs may reduce power consumption, reduce processor or modem operations, or a combination thereof. Additionally, a UE that received sharing information directly from an originating UE may propagate the sharing information to enable another device, that missed receiving sharing information directly from a COT originator, to still be able to attempt to access a resource during the COT.

Although the processes 600 and 700 are described as being performed by a UE, in some other implementations, the process of FIG. 6 or 7 may be performed by an apparatus configured for wireless communication. For example, the apparatus may include at least one processor, and a memory coupled to the processor. The processor may be configured to perform operations of one or more of the processes of FIG. 6 or 7. Additionally, or alternatively, the processes of FIG. 6 or 7 may be configured to be performed may a modem, such as control logic or a processor of the modem, or a PLC. In some other implementations, the processes of FIG. 6 or 7 may be performed or executed using a non-transitory computer-readable medium having program code recorded thereon. The program code may be program code executable by a computer for causing the computer to perform operations of one or more of the processes of FIG. 6 or 7.

It is noted that one or more blocks (or operations) described with reference to FIG. 6 or 7 may be combined with one or more blocks (or operations) of another of figure. For example, one or more blocks (or operations) of FIG. 6 may be combined with one or more blocks (or operations) FIG. 7. As another example, one or more blocks of FIG. 6 or 7 may be combined with one or more blocks (or operations) of another of FIG. 2, 3A, 3B, 4, or 5. Additionally, or alternatively, one or more operations described above with reference to FIGS. 1-7 may be combine with one or more operations described with reference to one or more of FIG. 8.

Figure 8:
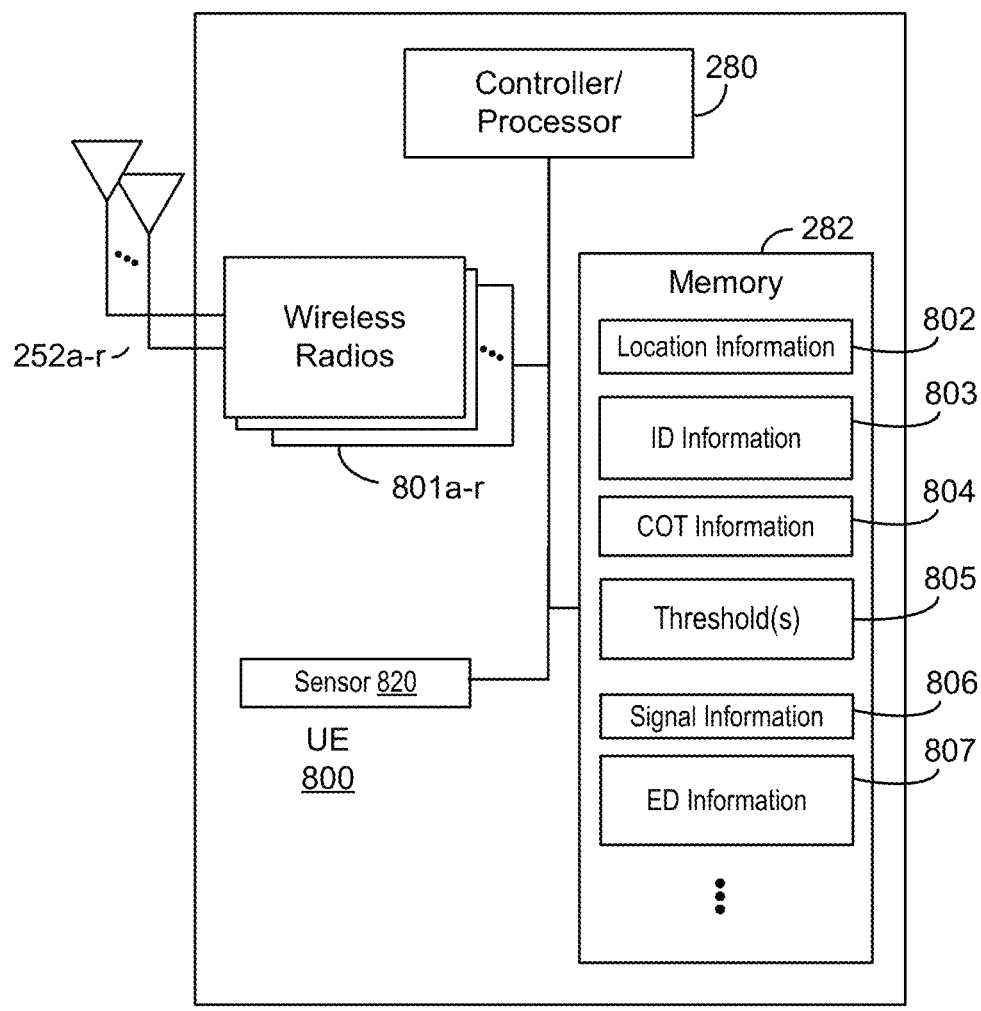
FIG. 8 is a block diagram conceptually illustrating a design of a UE.

FIG. 8 is a block diagram of an example UE 800 that supports COT sharing propagation according to some aspects. The UE 800 may be configured to perform operations, including the blocks of a process described with reference to FIG. 6 or 7, to perform COT sharing propagation. In some implementations, the UE 800 includes the structure, hardware, and components shown and described with reference to the UE 115 of FIG. 2 or 4. For example, the UE 800 includes the controller 280, which operates to execute logic or computer instructions stored in the memory 282, as well as controlling the components of the UE 800 that provide the features and functionality of the UE 800. The UE 800, under control of the controller 280, transmits and receives signals via wireless radios 801*a-r* and the antennas 252*a-r*. The wireless radios 801*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266. The UE may also include a sensor 820, such as a temperature sensor configured to detect a temperature of one or more components of the UE 800.

As shown, the memory 282 may include location information 802, ID information 803, COT information 804, one or more thresholds 805, signal information 806, and ED information 807. The location information 802 may include or correspond to the location information 306, 332, or 372, or the sharing information 384. The ID information 803 may include or correspond to the ID information 308, 334, or 374, the source ID 383, the source ID 392, or the sharing information 384. The COT information 804 may include or correspond to the COT information 310 or the sharing information 384. The one or more thresholds 805 may include or correspond to the threshold 330, 370, the sharing information 384, or the RRC message 380. The signal information 806 may include or correspond to the signal information 376. The ED information 807 may include or correspond to the ED information 378. The UE 800 may receive signals from or transmit signals to one or more devices, such as the base station 105 of FIGS. 1, 2, 3A, 3B, and 4, the UE 115, 320, 360, another network device, such as a RSU, a PLC, or a S/A device, or a combination thereof.

In some aspects, techniques for supporting COT sharing propagation may include additional aspects, such as any single aspect or any combination of aspects described below or in connection with one or more other processes or devices described elsewhere herein. In a first aspect, techniques for supporting COT sharing propagation may include receiving, by a wireless communication device, a first message from a first device, the first device includes an originator of a first COT; and transmitting a second message including a source ID of the first device. In some examples, the techniques in the first aspect may be implemented in a method or process. In some other examples, the techniques of the first aspect may be implemented in the wireless communication device, such as a UE (or a component of a UE), an RSU, a network entity, a PLC, or a sensor or actuator device, as illustrative, non-limiting examples. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the first message includes first SCI from the first device, the second message includes second SCI, or a combination thereof.

In a third aspect, in combination with the first aspect or the second aspect, the first message includes the source ID of the first device, sharing information associated with the first COT, or a combination thereof.

In a fourth aspect, in combination with the third aspect, the techniques further include detecting, based on the first message, the source ID of the first device, the sharing information associated with the first COT, or a combination thereof.

In a fifth aspect, in combination with one or more of the first aspect through the fourth aspect, the first message includes location information associated with the first device, an indication of a threshold, or a combination thereof.

In a sixth aspect, in combination with the fifth aspect, the location information includes coordinates associated with the first device, a zone identifier associated with the first device, or a combination thereof.

In a seventh aspect, in combination with one or more of the first aspect through the sixth aspect, the second message further includes a source ID of the wireless communication device, the sharing information associated with the first COT, or a combination thereof.

In an eighth aspect, in combination with one or more of the first aspect through the seventh aspect, the second message further includes the location information associated with the first device, an indication of a threshold, or a combination thereof.

In a ninth aspect, in combination with the eighth aspect, the threshold includes one or more distance thresholds, one or more signal strength thresholds, an ED threshold, or a combination thereof.

In a tenth aspect, in combination with one or more of the first aspect through the ninth aspect, the techniques further include receiving an RRC message from a base station.

In an eleventh aspect, in combination with the tenth aspect, the RRC message including the indication of the threshold.

In a twelfth aspect, in combination with one or more of the first aspect through the eleventh aspect, the techniques further include determining whether to transmit the second message.

In a thirteenth aspect, in combination with the twelfth aspect, the techniques further include selecting the threshold based on a determination the wireless communication device received the sharing information associated with the first COT directly from the first device.

In a fourteenth aspect, in combination with one or more of the twelfth aspect or thirteenth aspect, the techniques further include determining an ED value.

In a fifteenth aspect, in combination with the fourteenth aspect, the techniques further include performing a comparison based on the ED value and the threshold.

In a sixteenth aspect, in combination with the fifteenth aspect, a determination of whether to transmit the second message is based on a result of the comparison.

In a seventeenth aspect, in combination with one or more of the first aspect through the sixteenth aspect, the techniques further include, after expiration of the first COT, receiving, from a third device, a third message including a source ID of a fourth device and second sharing information associated with a second COT.

In an eighteenth aspect, in combination with the seventeenth aspect, the fourth device includes an originator of the second COT.

In a nineteenth aspect, in combination with the eighteenth aspect, the techniques further include determining whether to attempt access of a resource during the second COT based on the source ID of the fourth device.

In a twentieth aspect, in combination with the nineteenth aspect, prior to receiving the third message, the wireless communication device missed receiving the second sharing information associated with the second COT directly from the fourth device.

In a twenty-first aspect, in combination with one or more of the first aspect through the twentieth aspect, the wireless communication device is configured for V2X communication.

In a twenty-second aspect, in combination with the twenty-first aspect, the V2X communication includes C-V2X communication.

In a twenty-third aspect, in combination with the first aspect, the techniques further include receiving a second message including a second source ID of a second device, the second device includes a second originator of a second COT.

In a twenty-third aspect, in combination with the twenty-third aspect, the techniques further include determining whether to attempt access of a resource during the second COT based on the second source ID.

In a twenty-fourth aspect, in combination with the twenty-third aspect, the techniques further include attempting to access the resource during the second COT.

In a twenty-fifth aspect, in combination with the twenty-fourth aspect, the message is received from a third device and includes sidelink control information associated with the second device, sharing information associated with the COT, or a combination thereof.

In a twenty-sixth aspect, in combination with the twenty-fifth aspect, prior to receiving the second message, the wireless communication device missed receiving the sidelink information directly from the second device.

In a twenty-seventh aspect, in combination with the twenty-third aspect, the techniques further include determining a distance between the wireless communication device and the first device; and performing a first comparison based on the distance and a first threshold.

In a twenty-eighth aspect, in combination with the twenty-seventh aspect, the techniques further include measuring, based on the source ID, one or more sideline communications between the second device and the wireless communication device; determining, based on the measurement of the one or more sideline communications, a signal strength associated with the second device and the wireless communication device; and performing a second comparison based on the signal strength and a second threshold.

In a twenty-ninth aspect, in combination with the twenty-eighth aspect, the signal strength is associated with an RSRP, an RSSI, or a pathloss.

In a thirtieth aspect, in combination with the twenty-eighth aspect or the twenty-ninth aspect, determining whether to attempt access of the COT is based on a result of the first comparison, a result of the second comparison, or a combination thereof.

In a thirty-first aspect, in combination with the twenty-third aspect, the techniques further include determining an ED value; and performing a third comparison based on the ED value and an ED threshold.

In a thirty-second aspect, in combination with the thirty-first aspect, the ED threshold included in the second message, is determined based on an RRC message received by the wireless communication device, or a combination thereof.

In a thirty-third aspect, in combination with any of the thirty-first aspect or the thirty-second aspect, determining whether to attempt access of the COT is based on a result of the third comparison.

In a thirty-fourth aspect, in combination with the twenty-third aspect, the techniques further include receiving a third message from a fourth device, the fourth device includes a third originator of a third COT, the third message includes sidelink control information, the sidelink control information including a third source ID of the fourth device and sharing information associated with the third COT.

In a thirty-fifth aspect, in combination with the thirty-fourth aspect, the techniques further include transmitting a fourth message including a source ID of the wireless communication device, the source ID of the fourth device, the sharing information associated with the third COT, or a combination thereof.

In some aspects, techniques for supporting COT sharing propagation may include additional aspects, such as any single aspect or any combination of aspects described below or in connection with one or more other processes or devices described elsewhere herein. In a thirty-sixth aspect, techniques for supporting COT sharing propagation may include receiving, by a wireless communication device, a message including a source ID of a first device. The first device includes an originator of a COT. The techniques also include determining whether to attempt access of a resource during the COT based on the source ID. In some examples, the techniques in the thirty-sixth aspect may be implemented in a method or process. In some other examples, the techniques of the thirty-sixth aspect may be implemented in the wireless communication device, such as a UE (or a component of a UE), an RSU, a network entity, a PLC, or a sensor or actuator device, as illustrative, non-limiting examples. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a the thirty-seventh aspect, in combination with the thirty-sixth aspect, the message is received from a second device and includes sidelink control information associated with the first device.

In a thirty-eighth aspect, in combination with the thirty-sixth aspect or the thirty-seventh aspect, prior to receiving the message, the wireless communication device missed receiving the sidelink information directly from the first device.

In a thirty-ninth aspect, in combination with one or more of the thirty-sixth aspect through the thirty-eighth aspect, the techniques further include determining the source ID of the first device based on the message.

In a fortieth aspect, in combination with one or more of the thirty-sixth aspect through the thirty-ninth aspect, the techniques further include determining sharing information associated with the COT based on the message.

In a forty-first aspect, in combination with the fortieth aspect, the message further includes the sharing information.

In a forty-second aspect, in combination with one or more of the thirty-sixth aspect through the forty-first aspect, the techniques further include identifying the first device based on the source ID.

In a forty-third aspect, in combination with one or more of the thirty-sixth aspect through the forty-second aspect, the techniques further include determining a distance between the wireless communication device and the first device.

In a forty-fourth aspect, in combination with the forty-third aspect, the distance is determined based on location information, the location information is included in the message, or a combination thereof.

In a forty-fifth aspect, in combination with the forty-fourth aspect, the distance is an absolute distance or a relative distance.

In a forty-sixth aspect, in combination with the forty-fourth aspect, the location information includes first coordinates of the first device, a first zone ID associated with the first device, or a combination thereof.

In a forty-seventh aspect, in combination with the forty-fourth aspect, the distance is determined based on first coordinates of the first device, a first zone ID associated with the first device, second coordinates of the wireless communication device, a second zone ID associated with the wireless communication device, or a combination thereof.

In a forty-eighth aspect, in combination with one or more of the forty-third aspect through the forty-seventh aspect, the techniques further include performing a first comparison based on the distance and a first threshold.

In a forty-ninth aspect, in combination with the forty-eighth aspect, a determination whether to attempt access of the COT is based on a result of the first comparison.

In a fiftieth aspect, in combination with one or more of the thirty-sixth aspect through the forty-eighth aspect, the techniques further include determining a signal strength associated with the first device and the wireless communication device.

In a fifty-first aspect, in combination with the fiftieth aspect, the signal strength is associated with a RSRP, a RSSI, or a pathloss.

In a fifty-second aspect, in combination with one or more of the fiftieth aspect through the fifty-first aspect, the techniques further include measuring, based on the source ID, one or more sideline communications between the first device and the wireless communication device to determine the signal strength.

In a fifty-third aspect, in combination with one or more of the fiftieth aspect through the fifty-second aspect, the techniques further include performing a second comparison based on the signal strength and a second threshold.

In a fifty-fourth aspect, in combination with the fifty-third aspect, a determination of whether to attempt access of the COT is based on a result of the second comparison.

In a fifty-fifth aspect, in combination with one or more of the thirty-sixth aspect through the fifty-fourth aspect, the techniques further include determining an ED value.

In a fifty-sixth aspect, in combination with the fifty-fifth aspect, the techniques further include performing a third comparison based on the ED value and an ED threshold.

In a fifty-seventh aspect, in combination with the fifty-sixth aspect, a determination of whether to attempt access of the COT is based on a result of the third comparison.

In a fifty-eighth aspect, in combination with the fifty-seventh aspect, the ED threshold is included in the message, is determined based on an RRC message received by the wireless communication device, or a combination thereof.

In a fifty-ninth aspect, in combination with one or more of the thirty-sixth aspect through the fifty-eighth aspect, the techniques further include receiving one or more thresholds, the one or more thresholds including one or more distance thresholds, one or more signal strength thresholds, one or more ED thresholds, or a combination thereof.

In a sixtieth aspect, in combination with the fifty-ninth aspect, the techniques further include selecting at least one threshold of the one or more thresholds based on whether the wireless communication device received control information directly from the first device.

In a sixty-first aspect, in combination with one or more of the thirty-sixth aspect through the sixtieth aspect, the techniques further include attempting to access the resource during the COT.

In a sixty-second aspect, in combination with one or more of the thirty-sixth aspect through the sixty-first aspect, the techniques further include receiving a second message from a third device.

In a sixty-third aspect, in combination with the sixty-second aspect, the third device includes an originator of a second COT.

In a sixty-fourth aspect, in combination with the sixty-third aspect, the second message includes sidelink control information.

In a sixty-fifth aspect, in combination with the sixty-fourth aspect, the sidelink control information including a source ID of the third device and the sharing information is associated with the second COT.

In a sixty-sixth aspect, in combination with the sixty-fifth aspect, the techniques further include transmitting a third message including a source ID of the wireless communication device, the source ID of the third device, the sharing information associated with the second COT, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, etc., or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed at a user equipment (UE), comprising:
   receiving a first message from a first device, the first device includes an originator of a first channel occupancy time (COT); and
   transmitting a second message including a source identity (ID) of the first device,
   wherein:
      the second message further includes the location information associated with the first device, an indication of a threshold, or a combination thereof; and
      the threshold includes one or more distance thresholds, one or more signal strength thresholds, an energy detection (ED) threshold, or a combination thereof.

2. The method of claim 1, wherein the first message includes first sidelink control (SCI) from the first device, the second message includes second SCI, or a combination thereof.

3. The method of claim 1, wherein the first message includes the source ID of the first device, sharing information associated with the first COT, or a combination thereof, and further comprising detecting, based on the first message, the source ID of the first device, the sharing information associated with the first COT, or a combination thereof.

4. The method of claim 1, wherein:
   the first message includes location information associated with the first device, an indication of a threshold, or a combination thereof; and
   the location information includes coordinates associated with the first device, a zone identifier associated with the first device, or a combination thereof.

5. The method of claim 1, wherein the second message further includes a source ID of the UE, the sharing information associated with the first COT, or a combination thereof.

6. The method of claim 1, further comprising receiving a radio resource configuration (RRC) message from a base station, the RRC message including the indication of the threshold.

7. The method of claim 1, further comprising:
   determining whether to transmit the second message; and
   selecting the threshold based on a determination the UE received the sharing information associated with the first COT directly from the first device.

8. The method of claim 1, further comprising:
   determining whether to transmit the second message;
   determining an ED value; and
   performing a comparison based on the ED value and the threshold, and
   wherein determining whether to transmit the second message is based on a result of the comparison.

9. The method of claim 1, further comprising:
   after expiration of the first COT, receiving, from a third device, a third message including a source ID of a fourth device and second sharing information associated with a second COT, wherein the fourth device includes an originator of the second COT; and
   determining whether to attempt access of a resource during the second COT based on the source ID of the fourth device, and wherein, prior to receiving the third message, the UE missed receiving the second sharing information associated with the second COT directly from the fourth device.

10. The method of claim 1, wherein the UE is configured for vehicle-to-everything (V2X) communication.

11. The method of claim 1, further comprising:
   receiving a second message including a second source ID of a second device, the second device includes a second originator of a second COT; and
   determining whether to attempt access of a resource during the second COT based on the second source ID.

12. The method of claim 11, further comprising:
   attempting to access the resource during the second COT; and
   wherein:
      the message is received from a third device and includes sidelink control information associated with the second device, sharing information associated with the COT, or a combination thereof, and
      prior to receiving the second message, the UE missed receiving the sidelink information directly from the second device.

13. The method claim 11, further comprising:
   determining a distance between the UE and the first device; and
   performing a first comparison based on the distance and a first threshold; or
   measuring, based on the source ID, one or more sideline communications between the second device and the UE;
   determining, based on the measurement of the one or more sideline communications, a signal strength associated with the second device and the UE, wherein the signal strength is associated with a reference signal received power (RSRP), a received signal strength indicator (RSSI), or a pathloss; and performing a second comparison based on the signal strength and a second threshold, wherein determining whether to attempt access of the COT is based on a result of the first comparison, a result of the second comparison, or a combination thereof.

14. The method of claim 11, further comprising:

determining an energy detection (ED) value, the ED threshold included in the second message, is determined based on a radio resource configuration (RRC) message received by the UE, or a combination thereof;

performing a third comparison based on the ED value and an ED threshold;

wherein determining whether to attempt access of the COT is based on a result of the third comparison.

15. The method of claim 11, further comprising:

receiving a third message from a fourth device, the fourth device includes a third originator of a third COT, the third message includes sidelink control information, the sidelink control information including a third source ID of the fourth device and sharing information associated with the third COT; and transmitting a fourth message including a source ID of the UE, the source ID of the fourth device, the sharing information associated with the third COT, or a combination thereof.

16. A user equipment (UE) comprising:

a transceiver configured to receive a first message from a first device, the first device includes an originator of a first channel occupancy time (COT);

at least one processor; and a memory coupled with the at least one processor and storing processor-readable code that, when executed by the at least one processor, is configured to initiate transmission of a second message including a source identity (ID) of the first device, wherein:
the second message further includes the location information associated with the first device, an indication of a threshold, or a combination thereof; and
the threshold includes one or more distance thresholds, one or more signal strength thresholds, an energy detection (ED) threshold, or a combination thereof.

17. The UE of claim 16, wherein the first message includes first sidelink control (SCI) from the first device, the second message includes second SCI, or a combination thereof.

18. The UE of claim 16, wherein the first message includes the source ID of the first device, sharing information associated with the first COT, or a combination thereof, and further comprising detecting, based on the first message, the source ID of the first device, the sharing information associated with the first COT, or a combination thereof.

19. The UE of claim 16, wherein:
the first message includes location information associated with the first device, an indication of a threshold, or a combination thereof; and
the location information includes coordinates associated with the first device, a zone identifier associated with the first device, or a combination thereof.

20. The UE of claim 16, wherein the second message further includes a source ID of the UE, the sharing information associated with the first COT, or a combination thereof.

21. The UE of claim 16, further comprising receiving a radio resource configuration (RRC) message from a base station, the RRC message including the indication of the threshold.

22. The UE of claim 16, further comprising:
determining whether to transmit the second message; and
selecting the threshold based on a determination the UE received the sharing information associated with the first COT directly from the first device.

23. The UE of claim 16, further comprising:
determining whether to transmit the second message;
determining an ED value; and
performing a comparison based on the ED value and the threshold, and
wherein determining whether to transmit the second message is based on a result of the comparison.

24. The UE of claim 16, further comprising:
after expiration of the first COT, receiving, from a third device, a third message including a source ID of a fourth device and second sharing information associated with a second COT, wherein the fourth device includes an originator of the second COT; and
determining whether to attempt access of a resource during the second COT based on the source ID of the fourth device, and wherein, prior to receiving the third message, the UE missed receiving the second sharing information associated with the second COT directly from the fourth device.

25. The UE of claim 16, wherein the UE is configured for vehicle-to-everything (V2X) communication.

26. The UE of claim 16, further comprising:
receiving a second message including a second source ID of a second device, the second device includes a second originator of a second COT; and
determining whether to attempt access of a resource during the second COT based on the second source ID.

27. An apparatus configured for wireless communication, the apparatus comprising:
means for receiving a first message from a first device, the first device includes an originator of a first channel occupancy time (COT); and
means for transmitting a second message including a source identity (ID) of the first device, wherein:
the second message further includes the location information associated with the first device, an indication of a threshold, or a combination thereof; and
the threshold includes one or more distance thresholds, one or more signal strength thresholds, an energy detection (ED) threshold, or a combination thereof.

28. A non-transitory computer-readable medium storing instructions that, when executed by a processor, cause the processor to perform operations comprising:
receiving a first message from a first device, the first device includes an originator of a first channel occupancy time (COT); and
initiating transmission of a second message including a source identity (ID) of the first device, wherein:
the second message further includes the location information associated with the first device, an indication of a threshold, or a combination thereof; and
the threshold includes one or more distance thresholds, one or more signal strength thresholds, an energy detection (ED) threshold, or a combination thereof.

* * * * *